United States Patent
Moon et al.

(10) Patent No.: US 10,673,278 B2
(45) Date of Patent: Jun. 2, 2020

(54) APPARATUS AND METHOD FOR REDUCING ELECTROMAGNETIC WAVE IN WIRELESS POWER TRANSMISSION DEVICE

(71) Applicants: Electronics and Telecommunications Research Institute, Daejeon (KR); DONGYANG E&P INC., Pyeongtaek-si, Gyeonggi-do (KR)

(72) Inventors: Jung Ick Moon, Daejeon (KR); Seong Uk Baek, Suwon-si (KR); Byoung In Lee, Yongin-si (KR); Woo Chul Lee, Osan-si (KR); Jong Seup Lee, Yongin-si (KR); Dong Woo Cheon, Suwon-si (KR); Sang Bong Jeon, Daejeon (KR); Seong Min Kim, Daejeon (KR); Duk Ju Ahn, Daejeon (KR); In Kui Cho, Daejeon (KR); Byung Chan Kim, Daejeon (KR); Je Hoon Yun, Daejeon (KR); Dong Won Jang, Daejeon (KR); Hyung Do Choi, Daejeon (KR)

(73) Assignees: Electronics and Telecommunications Research Institute, Daejeon (KR); DONGYANG E&P INC., Pyeongtaek-si, Gyeonggi-do (KR)

(*) Notice: Subject to any disclaimer, the term of this patent is extended or adjusted under 35 U.S.C. 154(b) by 239 days.

(21) Appl. No.: 15/267,622

(22) Filed: Sep. 16, 2016

(65) Prior Publication Data

US 2017/0141615 A1 May 18, 2017

(30) Foreign Application Priority Data

Jul. 17, 2015 (KR) .......................... 10-2015-0101908
Nov. 18, 2015 (KR) .......................... 10-2015-0161889

(51) Int. Cl.
H01F 27/42 (2006.01)
H01F 37/00 (2006.01)
(Continued)

(52) U.S. Cl.
CPC .............. *H02J 50/12* (2016.02); *H02J 50/50* (2016.02); *H02J 50/70* (2016.02); *H02J 50/90* (2016.02)

(58) Field of Classification Search
CPC .. H02J 50/12; H02J 50/50; H02J 50/90; H02J 50/70
See application file for complete search history.

(56) References Cited

U.S. PATENT DOCUMENTS

| 2010/0038970 A1* | 2/2010 | Cook ...................... H02J 7/025 307/104 |
| 2011/0133569 A1* | 6/2011 | Cheon .................... H02J 17/00 307/104 |

(Continued)

FOREIGN PATENT DOCUMENTS

KR 1020150067520 A 6/2015

OTHER PUBLICATIONS

Hwansoo Moon et al., "Design of a Novel Resonant Reactive Shield for Wireless Charging System in Electric Vehicle," IEEE, 2014, pp. 220-223.

*Primary Examiner* — Rexford N Barnie
*Assistant Examiner* — Rasem Mourad
(74) *Attorney, Agent, or Firm* — William Park & Associates Ltd.

(57) ABSTRACT

Provided is a wireless power transmission device to reduce an electromagnetic wave except for a signal to be transmitted during wireless power transmission, the wireless power transmission device including a transmitter configured to generate a magnetic field by inputting a high-frequency (Continued)

power signal generated by a transmission circuit into a first coil, a receiver configured to generate an induced current by allowing the generated magnetic field to pass through a second coil, and a reducer configured to reduce a harmonic component of the high-frequency power signal using a third coil inserted on a path between the transmitter and the receiver.

6 Claims, 19 Drawing Sheets

(51) Int. Cl.
*H01F 38/00* (2006.01)
*H02J 50/12* (2016.01)
*H02J 50/70* (2016.01)
*H02J 50/90* (2016.01)
*H02J 50/50* (2016.01)

(56) References Cited

U.S. PATENT DOCUMENTS

| | | | | |
|---|---|---|---|---|
| 2012/0161696 A1* | 6/2012 | Cook | ............... | B60L 11/182 320/108 |
| 2013/0015699 A1* | 1/2013 | Mita | ............... | H02J 5/005 307/9.1 |
| 2015/0102683 A1* | 4/2015 | Bae | ............... | H02J 17/00 307/104 |
| 2015/0194811 A1* | 7/2015 | Mao | ............... | H02J 7/025 307/104 |
| 2015/0246614 A1* | 9/2015 | Dames | ............... | B60L 5/005 191/10 |
| 2015/0333560 A1* | 11/2015 | Brach | ............... | H02J 7/04 320/108 |
| 2015/0357827 A1* | 12/2015 | Muratov | ............... | H02J 50/10 307/104 |

* cited by examiner

Capacitor 720

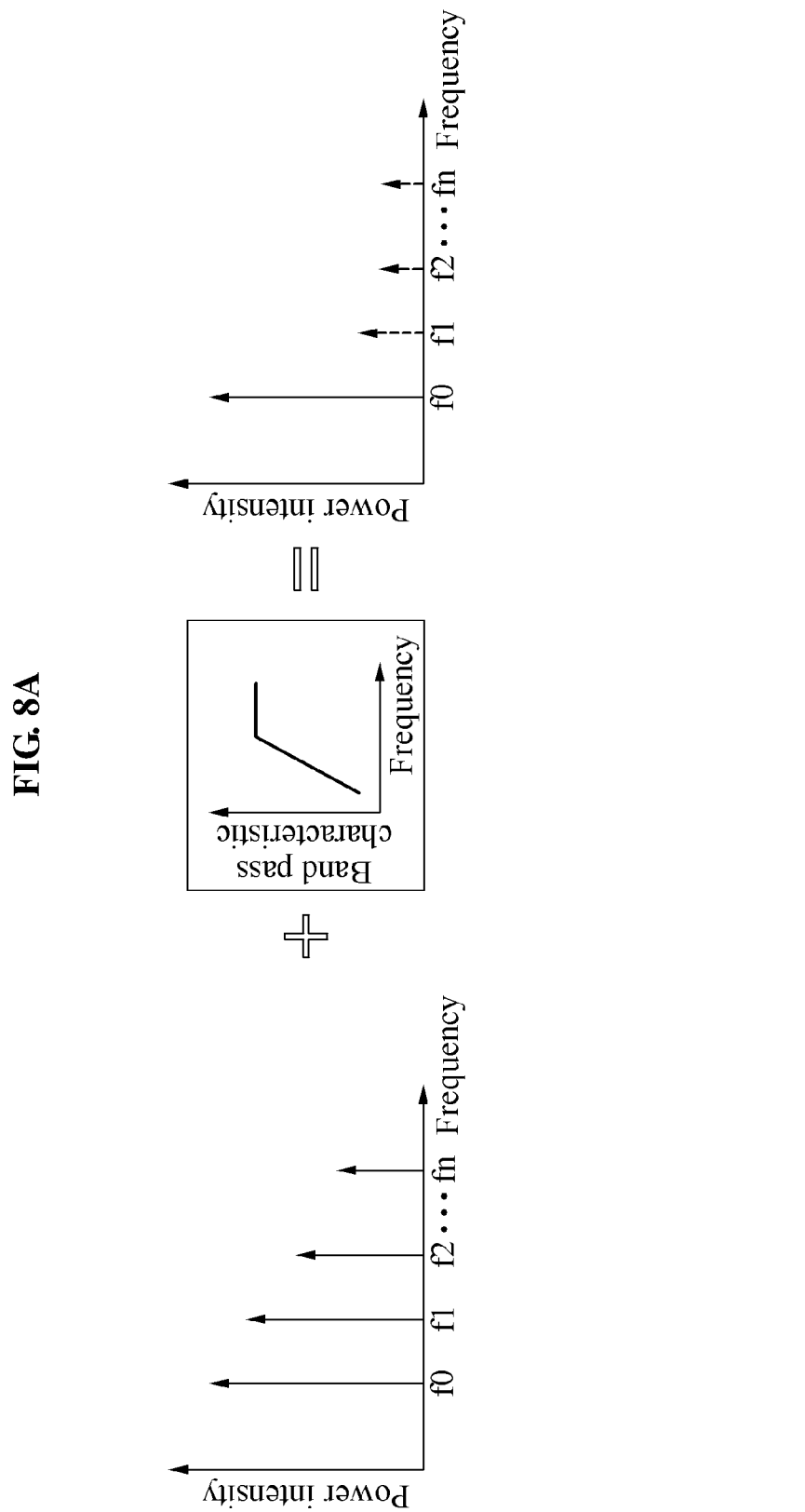

APPARATUS AND METHOD FOR REDUCING ELECTROMAGNETIC WAVE IN WIRELESS POWER TRANSMISSION DEVICE

CROSS-REFERENCE TO RELATED APPLICATIONS

This application claims the priority benefit of Korean Patent Application No. 10-2015-0101908 filed on Jul. 17, 2015 and Korean Patent Application No. 10-2015-0161889 filed on Nov. 18, 2015 in the Korean Intellectual Property Office, the disclosures of which are incorporated herein by reference for all purposes.

BACKGROUND

1. Field

One or more example embodiments relate to technology to reduce an electromagnetic wave in a wireless power transmission device, and more particularly, to an apparatus and method for reducing an electromagnetic wave that influences a wireless power transmission device or is externally emitted, except for power transmitted in a process of transmitting wireless power or energy.

2. Description of Related Art

Wireless power transmission technology was mainly used in the field of smart phones. Recently, the technology is spreading to the field of wearable devices, Internet of Things (IoT), or electric vehicle charging. As power to be transmitted increases from few watts (W) of low-output power to few kilowatts (kW) of high-output power, there is growing concern about emission of electromagnetic waves not intended to be transmitted.

To transmit wireless power, a transmission circuit that generates high-output and high-frequency power, a coil to transfer the power, and a reception circuit are needed. In general, the transmission circuit uses square waves, and thus harmonics except for power transmission frequencies may be transmitted or radiated through a conductive wire, or emitted externally directly through the coil. Such harmonics may cause malfunction of components in the circuit or interfere with other devices near a wireless power transmission device, and thus need to be reduced. Further, devices sensitive to electromagnetic waves have strict limits on electromagnetic wave intensity with respect to power signals except for power transmission frequencies. To use the wireless power transmission device in conjunction with such devices, development of a product that satisfies the limits on electromagnetic wave intensity is needed.

SUMMARY

According to an aspect, there is provided a wireless power transmission device to reduce an electromagnetic wave except for a signal to be transmitted during wireless power transmission, the wireless power transmission device including a transmitter configured to generate a magnetic field by inputting a high-frequency power signal generated by a transmission circuit into a first coil, a receiver configured to generate an induced current by allowing the generated magnetic field to pass through a second coil, and a reducer configured to reduce a harmonic component of the high-frequency power signal using a third coil inserted on a path between the transmitter and the receiver.

The high-frequency power signal may be a square wave signal generated using a switching device of the transmission circuit.

The reducer may be disposed to enclose at least one of the first coil or the second coil using the third coil with a diameter greater than or equal to a diameter of the first coil or the second coil.

The first coil and the second coil may each be at least one of a solenoid loop coil or a helical loop coil. However, example embodiments are not limited thereto.

The reducer may be configured to adjust a reference frequency of the harmonic component to be reduced by adjusting an inductance or a number of turns of the third coil.

The reducer may be configured to connect at least one of an impedance matching circuit or a resonant device to the third coil, and adjust a resonant frequency of the third coil to be less than or equal to a frequency domain of the harmonic component to be reduced using at least one of the impedance matching circuit or the resonant device.

The reducer may be configured to attenuate an even mode signal of the harmonic component when a coiling direction of the third coil is the same as coiling directions of the first coil and the second coil, and attenuate an odd mode signal of the harmonic component when the coiling direction of the third coil is opposite to the coiling directions of the first coil and the second coil.

According to another aspect, there is also provided a method of reducing an electromagnetic wave except for a signal to be transmitted during power signal transmission in a wireless power transmission device, the method including generating a magnetic field by inputting a high-frequency power signal generated by a transmission circuit into a first coil, reducing a harmonic component of the high-frequency power signal using a third coil inserted between the first coil and a second coil, and generating an induced current by allowing a signal except for the reduced harmonic component in the generated magnetic field to pass through the second coil.

The high-frequency power signal may be a square wave signal generated using a switching device of the transmission circuit.

The reducing may include disposing the third coil to enclose at least one of the first coil or the second coil, the third coil with a diameter greater than or equal to a diameter of the first coil or the second coil.

The first coil and the second coil may each be at least one of a solenoid loop coil or a helical loop coil. However, example embodiments are not limited thereto.

The reducing may include adjusting a reference frequency of the harmonic component to be reduced by adjusting an inductance or a number of turns of the third coil.

The reducing may include connecting at least one of an impedance matching circuit or a resonant device to the third coil, and adjusting a resonant frequency of the third coil to be less than or equal to a frequency domain of the harmonic component to be reduced using at least one of the impedance matching circuit or the resonant device.

The reducing may include attenuating an even mode signal of the harmonic component when a coiling direction of the third coil is the same as coiling directions of the first coil and the second coil, and attenuating an odd mode signal of the harmonic component when the coiling direction of the third coil is opposite to the coiling directions of the first coil and the second coil.

According to still another aspect, there is also provided a method of reducing an electromagnetic wave except for a signal to be transmitted during power signal transmission in a wireless power transmission device, the method including generating a magnetic field by inputting a high-frequency power signal generated by a transmission circuit into a first coil, reducing a harmonic component of the high-frequency power signal using a third coil disposed on a plane on which at least one of the first coil or a second coil is disposed, and generating an induced current by allowing the generated magnetic field to pass through the second coil.

The reducing may include adjusting a reference frequency of the harmonic component to be reduced by adjusting an inductance or a number of turns of the third coil.

The reducing may include connecting at least one of an impedance matching circuit or a resonant device to the third coil, and adjusting a resonant frequency of the third coil to be less than or equal to a frequency domain of the harmonic component to be reduced using at least one of the impedance matching circuit or the resonant device.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIGS. 8A and 8B illustrate an effect of reducing an electromagnetic wave by connection between an electromagnetic wave reducing coil and a matching circuit or resonant device according to an example embodiment.

DETAILED DESCRIPTION

Figure 1:
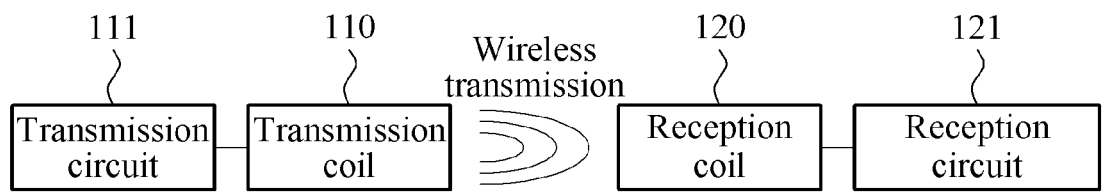
FIG. 1 is a diagram illustrating a configuration of a general wireless power transmission device.

Hereinafter, reference will now be made in detail to example embodiments with reference to the accompanying drawings, wherein like reference numerals refer to like elements throughout. However, the scope of the disclosure is not limited to those example embodiments.

The terms used herein are mainly selected from general terms currently being used in related art(s). However, other terms may be used depending on development and/or changes in technology, custom, or a preference of an operator. Thus, it should be understood that the terms used herein are terms merely used to describe the example embodiments, rather terms intended to limit the spirit and scope of this disclosure.

In addition, in a specific case, most appropriate terms have been arbitrarily selected by the inventors for ease of description and/or for ease of understanding. In this instance, the meanings of the arbitrarily used terms will be clearly explained in the corresponding description. Hence, the terms should be understood not by the simple names of the terms, but by the meanings of the terms and the following overall description of this specification.

FIG. 1 is a diagram illustrating a configuration of a general wireless power transmission device.

The general wireless power transmission device of FIG. 1 is a device that supplies or charges a desired load with energy by generating an induced current in two adjacent coils. The general wireless power transmission device includes a transmitter configured to generate and transmit a high-output/high-frequency signal to be used to transmit power, and a receiver configured to supply a desired load with energy by rectifying the input high-frequency power.

Referring to FIG. 1, the wireless power transmission device may transmit power using a transmission coil 110 of the transmitter and a reception coil 120 of the receiver. The transmitter of the wireless power transmission device may generate a high-output/high-frequency signal to be used to transmit the power using a transmission circuit 111. When the generated high-output/high-frequency signal is input into the transmission coil 110, a magnetic field may be generated. When the magnetic field generated in the transmission coil 110 passes through the reception coil 120 of the receiver, an induced current may be generated. The generated induced current may be rectified through a reception circuit 121, converted into a direct current (DC), and provided as energy to be used for charging.

The transmission coil 110 and the reception coil 120 may each include a conductive wire with excellent conductivity. When energy is to be transmitted in a form of magnetic field, a solenoid coil or a helical coil may be used. When energy is to be transmitted in a form of electric field, a flat conductive coil may be used. Further, to increase a power transmission efficiency of the wireless power transmission device, an additional circuit may be connected to an input terminal of the transmission coil 110 or an output terminal of the reception coil 120 and used for impedance matching in view of a transmission frequency.

Figure 2A:
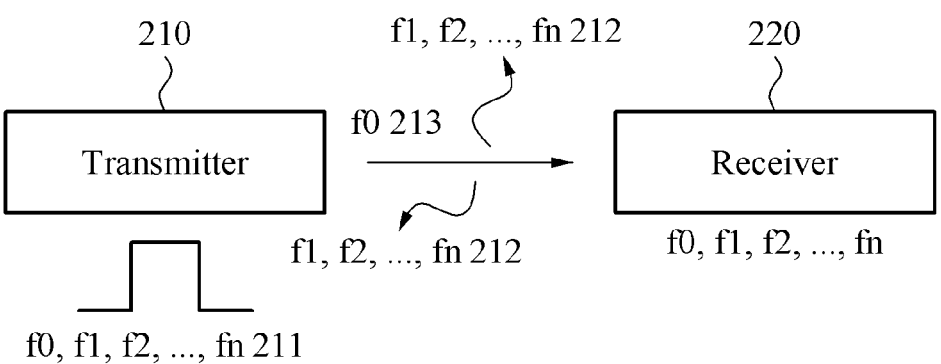
FIGS. 2A, 2B and 2C illustrate a principle of power transmission using a transmission or reception coil in a general wireless power transmission device.
Figure 2B:
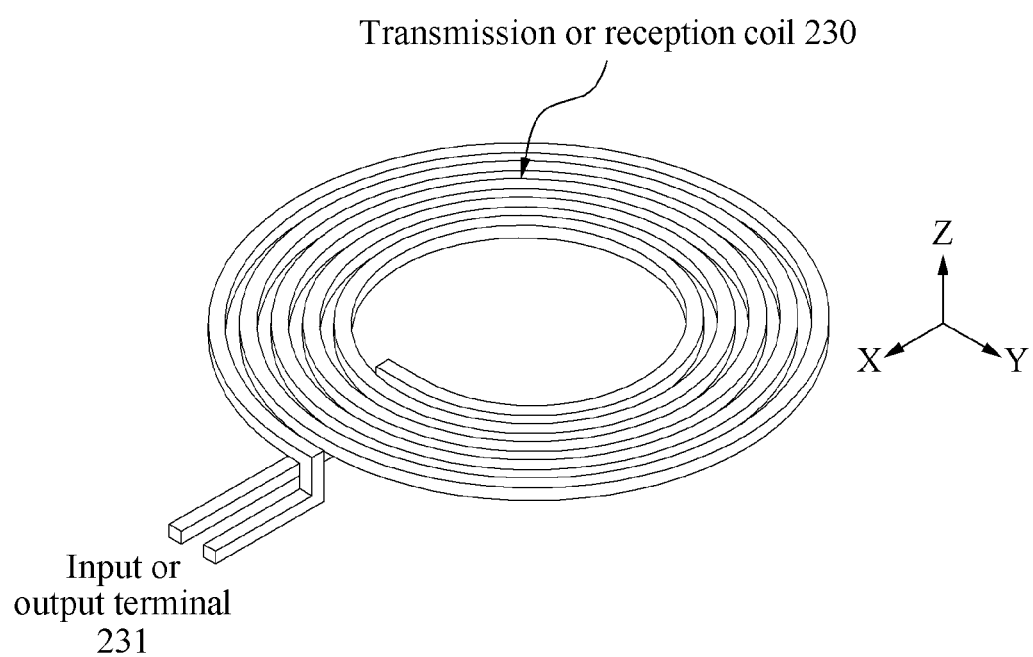
Figure 2C:
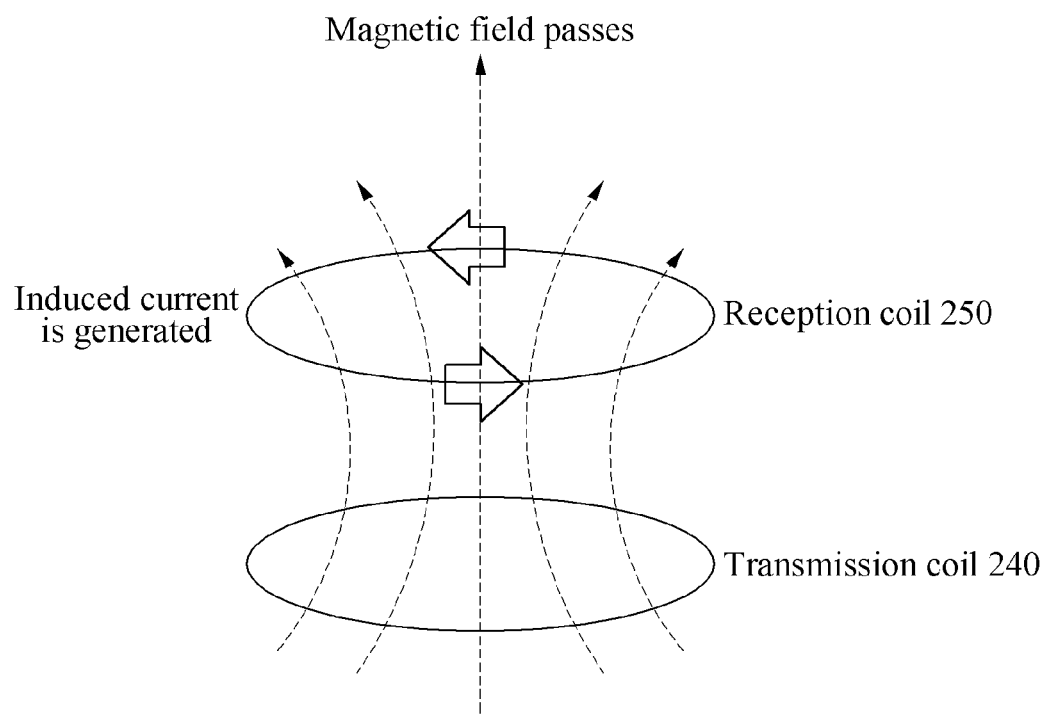

FIGS. 2A, 2B and 2C illustrate a principle of power transmission using a transmission or reception coil in a general wireless power transmission device.

In detail, FIG. 2A illustrates a process of transferring a signal and a frequency generated by the general wireless power transmission device, FIG. 2B illustrates a shape of a transmission or reception coil of the general wireless power transmission device, and FIG. 2C illustrates a principle of power transmission between a transmission coil and a reception coil.

In order for the general wireless power transmission device to transmit wireless power, a transmitter 210 may need to generate a high-output/high-frequency power signal. The transmitter 210 may generate square wave high-frequency power signals 211 using a switching device, for example, a field effect transistor (FET). As shown in FIG. 2A, the high-frequency power signals 211 include a frequency signal f0 213 to be transmitted and harmonics f1, f2, ... fn 212 which are unnecessary for power transmission. A portion of the harmonics 212 may be transmitted to a receiver 220 of the wireless power transmission device or additionally generated by a non-linear device used in a rectification process of the receiver 220. Such harmonics 212 may cause malfunction of components in the wireless power transmission device or be emitted externally to the device to interfere with nearby devices, and thus need to be reduced. In general, to reduce harmonics in the wireless power transmission device, a differential circuit is used or a scheme of dispersing a harmonic energy spectrum by adjusting a clock rise time is used. However, due to a limitation to reduction effect, a method of reducing harmonics more efficiently is demanded.

In the general wireless power transmission device, an induced current may be generated using two adjacent coils. FIG. 2B illustrates a coil 230 used in the process of generating an induced current. When the coil 230 operates as a transmission coil, the coil 230 may be connected to a transmission circuit through an input terminal 231. When the coil 230 operates as a reception coil, the coil 230 may be connected to a reception circuit or a charging circuit through an output terminal 231. Since power to be transmitted corresponds to a magnetic field, a loop coil is widely used. To reduce a volume of the coil, a solenoid coil is used rather than a helical coil. However, in a case in which the power to be transmitted corresponds to an electric field, a flat conductive coil may be used rather than the loop coil.

Referring to FIG. 2C, the general wireless power transmission device may transmit wireless power using a magnetic induction phenomenon occurring in a transmission coil 240 and a reception coil 250. A magnetic field may be formed by a high-frequency current input into the transmission coil 240, and the magnetic induction phenomenon in which an induced current is generated in the reception coil 250 may occur when the magnetic field passes through or links with the reception coil 250. However, in this process, when a plurality of frequencies are input into the transmission coil 240, in addition to frequency signals to be transmitted, even harmonics which are unnecessary for power transmission may be transmitted to the reception coil 250, which induces noise in the reception circuit or malfunction of nearby devices.

Figure 3:
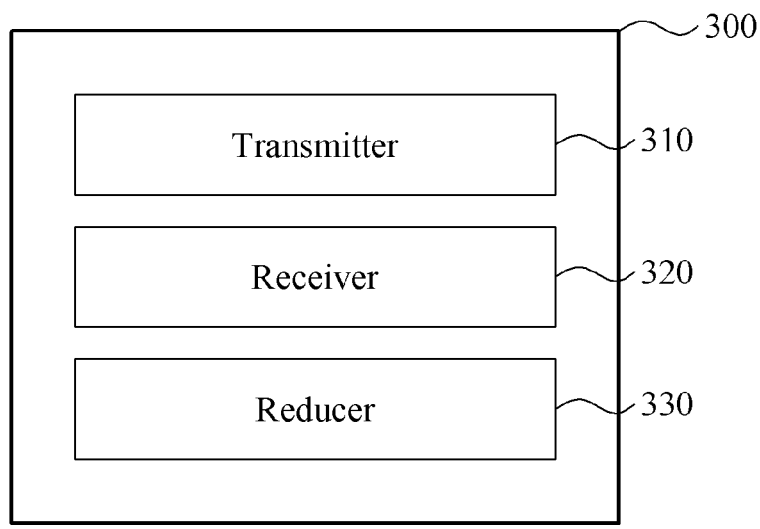
FIG. 3 is a block diagram illustrating a wireless power transmission device to reduce an electromagnetic wave except for a signal to be transmitted during wireless power transmission according to an example embodiment.

FIG. 3 is a block diagram illustrating a wireless power transmission device to reduce an electromagnetic wave except for a signal to be transmitted during wireless power transmission according to an example embodiment.

Referring to FIG. 3, a wireless power transmission device 300 may include a transmitter 310, a receiver 320, and a reducer 330, as constituents to reduce an electromagnetic wave (unnecessary for power transmission) that influences the wireless power transmission device or is externally emitted, except for a frequency signal to be transmitted, in a process of transmitting wireless power or energy.

The transmitter 310 may generate a magnetic field by inputting a high-frequency power signal generated by a transmission circuit into a first coil. The high-frequency power signal may be a square wave signal generated using a switching device included in the transmission circuit.

The receiver 320 may generate an induced current by allowing the generated magnetic field to pass through a second coil. The first coil and the second coil may each be at least one of a solenoid loop coil or a helical loop coil.

The reducer 330 may reduce a harmonic component of the high-frequency power signal using a third coil inserted on a path between the transmitter 310 and the receiver 320. The third coil may have a diameter greater than or equal to a diameter of the first coil and/or the second coil, and be inserted to enclose at least one of the first coil or the second coil. However, the position and the size of the third coil are not limited thereto, and the third coil may be implemented in any of various manners. The reducer 330 may adjust a reference frequency of the harmonic component to be reduced by adjusting an inductance or a number of turns of the third coil. Further, the reducer 330 may connect at least one of an impedance matching circuit or a resonant device to the third coil to increase an effect of reducing the harmonic component, and adjust a resonant frequency of the third coil to be less than or equal to a frequency domain of the harmonic component to be reduced using at least one of the impedance matching circuit or the resonant device.

The reducer 330 may reduce the harmonic component in a different manner based on a coiling direction of the third coil. For example, the reducer 330 may attenuate an even mode signal of the harmonic component when the coiling direction of the third coil is the same as coiling directions of the first coil and the second coil, and attenuate an odd mode signal of the harmonic component when the coiling direction of the third coil is opposite to the coiling directions of the first coil and the second coil.

The wireless power transmission device 300 may additionally insert the third coil to reduce an electronic wave, in addition to a transmission coil, for example, the first coil, and a reception coil, for example, the second coil that are used in a general wireless power transmission process, thereby reducing an electromagnetic wave unnecessary for power transmission and further increasing its power transmission efficiency.

Figure 4A:
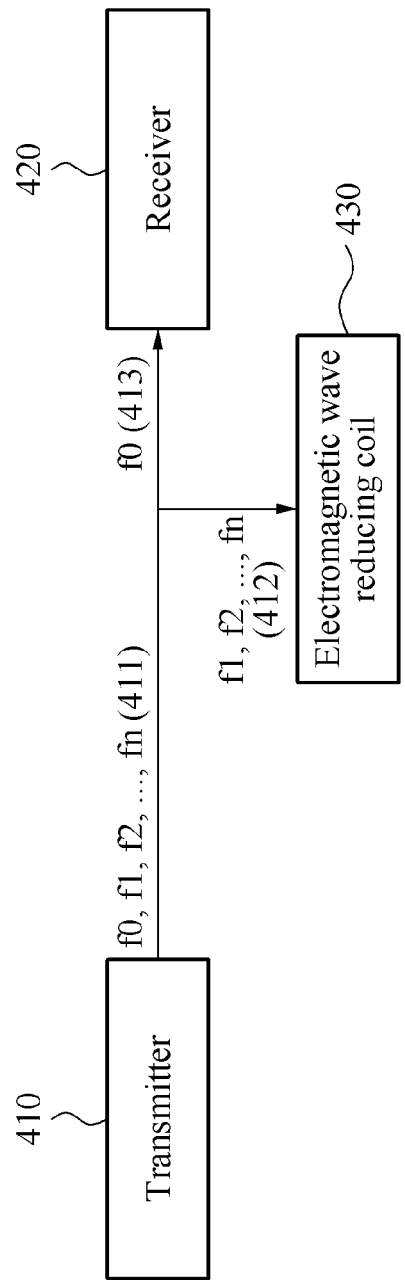
FIGS. 4A and 4B illustrate a principle of reducing an electromagnetic wave in a wireless power transmission device according to an example embodiment.
Figure 4B:
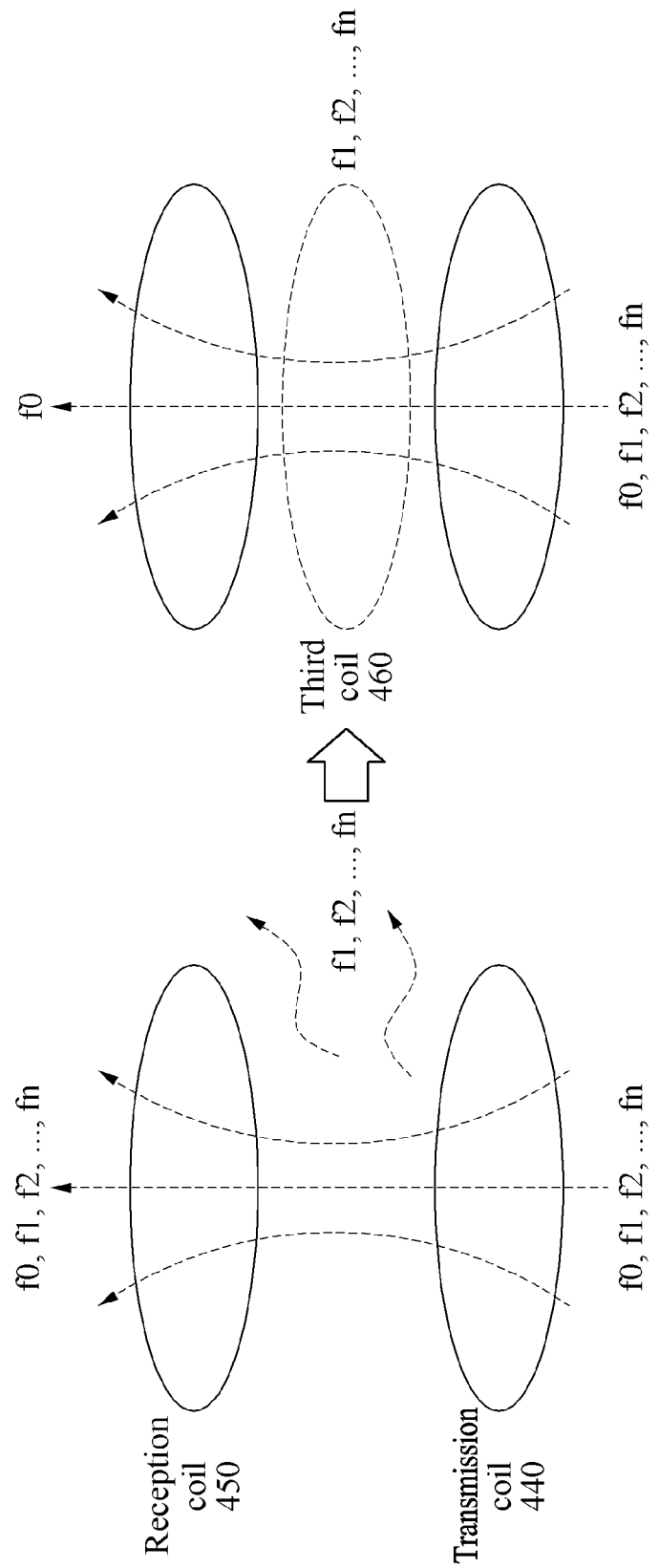

FIGS. 4A and 4B illustrate a principle of reducing an electromagnetic wave in a wireless power transmission device according to an example embodiment.

In detail, FIG. 4A illustrates a process of transferring a signal and a frequency generated by the wireless power transmission device, and FIG. 4B illustrates an operating principle of an electromagnetic wave reducing coil being added thereto.

The wireless power transmission device may reduce an electromagnetic wave unnecessary for power transmission, by additionally inserting an electromagnetic wave reducing coil on a path between a transmitter and a receiver of a general wireless power transmission device. A transmitter 410 of the wireless power transmission device may generate square wave high-frequency power signals 411 using a transmission circuit. The high-frequency power signals 411 may be transferred to a receiver 420 of the wireless power transmission device. In this process, harmonics f1, f2, ..., fn 412 included in the high-frequency power signals 411 may be reduced through an electromagnetic wave reducing coil 430, and a frequency signal f0 413 to be transmitted included in the high-frequency power signals 411 may be transmitted to the receiver 420.

A left side of FIG. 4B illustrates a power transmission process of the existing general power transmission device, and a right side thereof illustrates a power transmission process of the wireless power transmission device according to an example embodiment. As shown in FIG. 4B, in response to a plurality of frequency signals being input into a first coil 440, for example, a transmission coil, in a case in which wireless power is transmitted using the first coil 440 and a second coil 450, for example, a reception coil, the plurality of frequency signals may also be transmitted to the second coil 450, and a portion of the frequency signals may be emitted externally based on an impedance matching characteristic of the transmission and reception coils. In this process, among the plurality of frequency signals, the frequency signal f0 to be transmitted and the harmonics f1, f2, . . . fn unnecessary for power transmission may be transmitted together to the second coil 450 or emitted externally, which may cause malfunction of components in the wireless power transmission device or interfere with other devices near the wireless power transmission device. However, as shown on the right side of FIG. 4B, by adding a third coil 460 configured to reduce an electromagnetic wave on a path between the first coil 440 and the second coil 450, external radiation of the harmonics may be blocked, whereby the power transmission efficiency in the wireless power transmission process may improve.

Figure 5A:
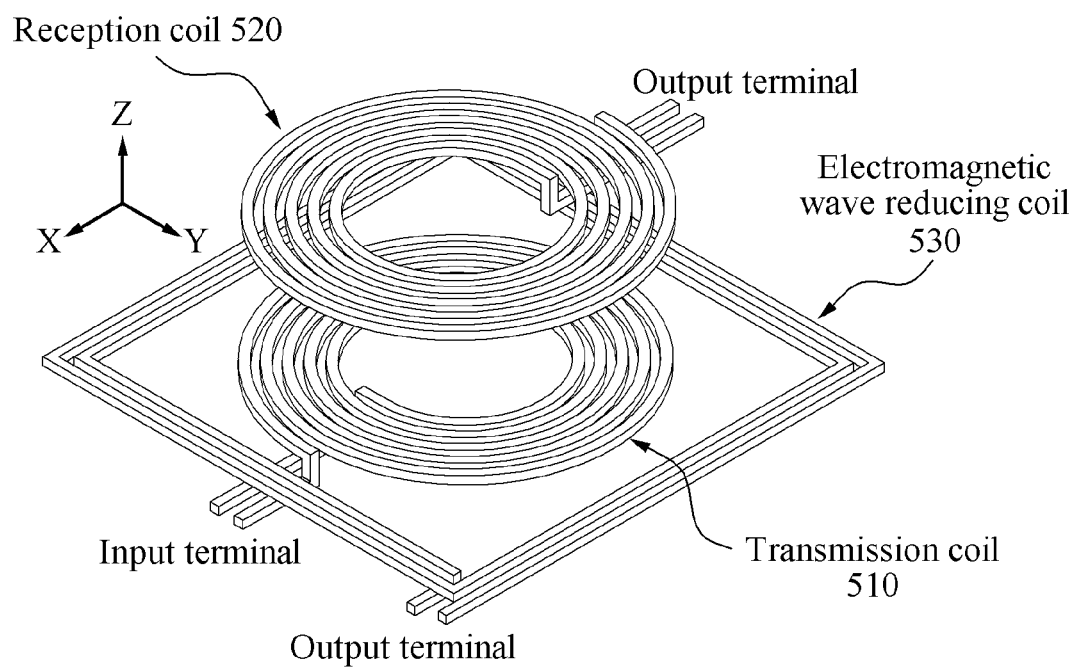
FIGS. 5A, 5B and 5C illustrate an electromagnetic wave reducing coil used in a wireless power transmission device according to an example embodiment.
Figure 5B:
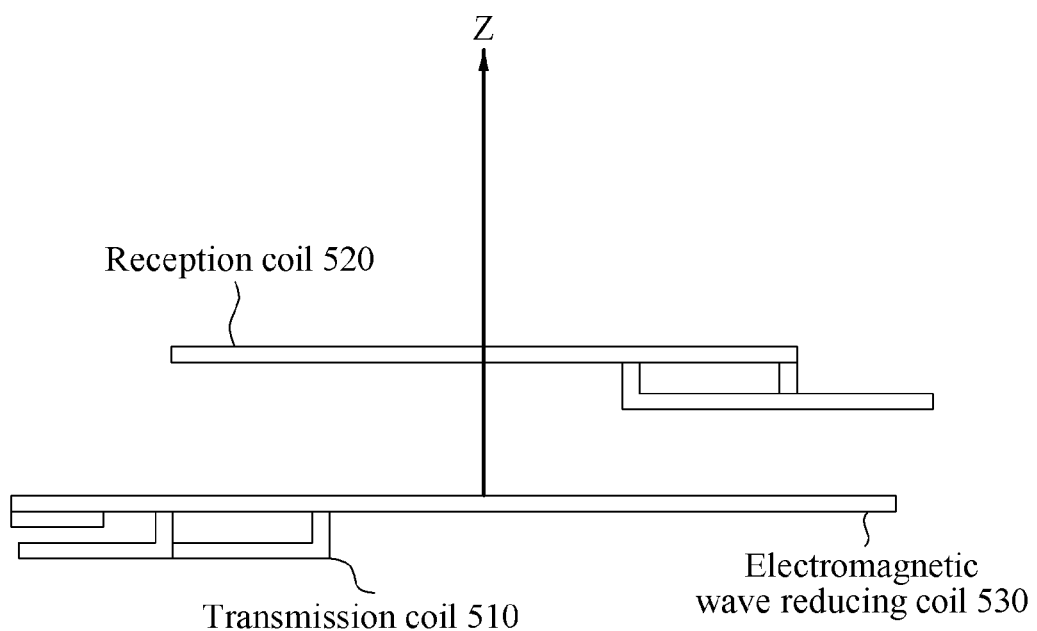
Figure 5C:
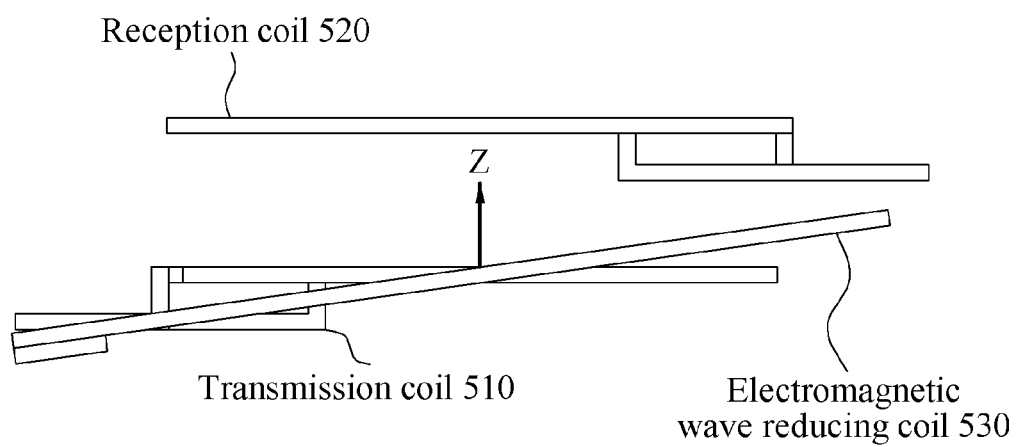

FIGS. 5A, 5B and 5C illustrate an electromagnetic wave reducing coil used in a wireless power transmission device according to an example embodiment, in detail, FIG. 5A is a three-dimensional view of the electromagnetic wave reducing coil being disposed, and FIGS. 5B and 5C are side views of the electromagnetic wave reducing coil being disposed.

An electromagnetic wave reducing coil 530 may be added to a wireless power transmission device to reduce harmonics unnecessary for a wireless power transmission process. In a case in which the electromagnetic wave reducing coil 530 is inserted to enclose a transmission coil 510, a magnetic field generated in the transmission coil 510 may be reduced in all directions. Thus, the harmonics may be reduced much efficiently when compared to a case in which the electromagnetic wave reducing coil 530 is inserted locally on one side or inserted to overlap the transmission coil 510 and a reception coil 520. For example, as shown in FIG. 5A, in a case in which the electromagnetic wave reducing coil 530 is inserted to be disposed on a plane on which the transmission coil 510 is disposed, it may be advantageous to manufacture a thin film wireless charge transmitter. In a case in which the electromagnetic wave reducing coil 530 is inserted to be disposed on a plane on which the reception coil 520 is disposed, it may be advantageous to manufacture a thin film wireless charge receiver. In an example, the electromagnetic wave reducing coil 530 may be inserted into each of the transmission coil 510 and the reception coil 520.

However, the position at which the electromagnetic wave reducing coil 530 is inserted or the shape of the electromagnetic wave reducing coil 530 is not limited thereto, and the electromagnetic wave reducing coil 530 may be implemented in any of various manners depending on a purpose of using the wireless power transmission device. The electromagnetic wave reducing coil 530 may be provided in any of various shapes such as quadrangular, circular, oval, and polygonal shapes, and may be inserted at any position. For example, the electromagnetic wave reducing coil 530 may be inserted on the plane on which the transmission coil 510 is disposed, that is, an x-y plane having the same value of z as shown in FIG. 5B, on the plane on which the reception coil 520 is disposed, or on a plane between the transmission coil 510 and the reception coil 520. In an example, the electromagnetic wave reducing coil 530 may be inserted to be disposed at a lower position than the transmission coil 510 or at a higher position than the reception coil 520.

Further, to manufacture a thin film device, it is advantageous to dispose the electromagnetic wave reducing coil 530 to be parallel with the transmission coil 510 and the reception coil 520. However, in view of an inner space of the device, the electromagnetic wave reducing coil 530 may be disposed to tilt to some extent as shown in FIG. 5C.

Meanwhile, the size of the electromagnetic wave reducing coil 530 may be set to be similar to or greater than a diameter of the transmission coil 510 or the reception coil 520 such that the transmission coil 510 and the reception coil 520 may be included in the electromagnetic wave reducing coil 530, whereby an unnecessary magnetic field generated in the transmission coil 510 and the reception coil 520 may be removed effectively. Further, a design parameter may be changed by adjusting an inductance or a number of turns of the electromagnetic wave reducing coil 530 based on a frequency band of a signal to be reduced.

FIGS. 6A, 6B, 6C and 6D illustrate examples of wireless power transmission devices to which electromagnetic wave reducing coils are applied according to example embodiments.

Figure 6A:
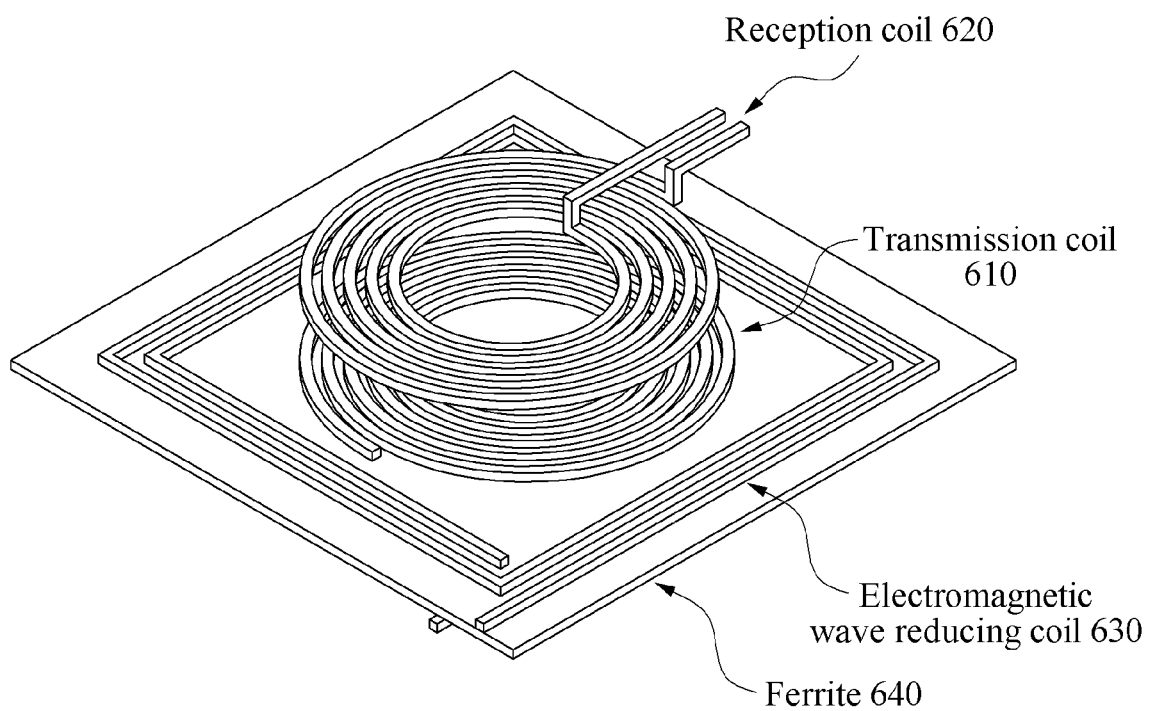
FIGS. 6A, 6B, 6C and 6D illustrate examples of wireless power transmission devices to which electromagnetic wave reducing coils are applied according to example embodiments.

FIG. 6A is an example of a wireless power transmission device implemented on a ferromagnetic material such as ferrite. A transmission coil 610, a reception coil 620, and an electromagnetic wave reducing coil 630 may be disposed on the ferrite. As shown in FIG. 6A, in a case in which the electromagnetic wave reducing coil 630 is disposed on the ferrite, an inductance and a quality factor thereof may change due to a high relative permeability of a magnetic body.

Figure 6B:
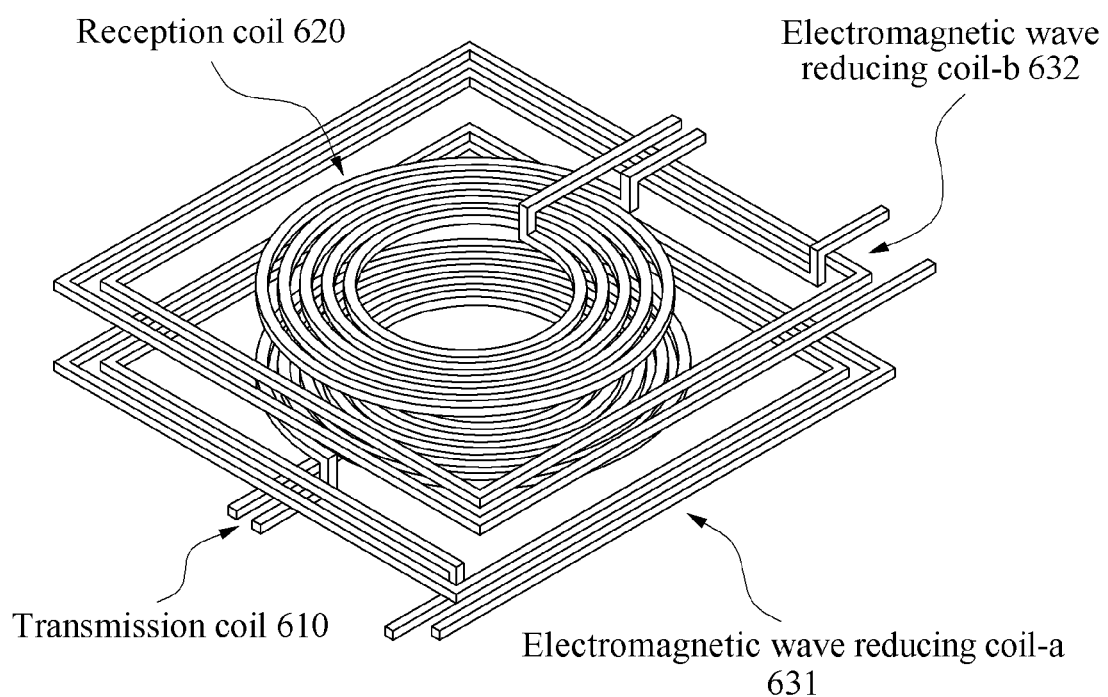
Figure 6C:
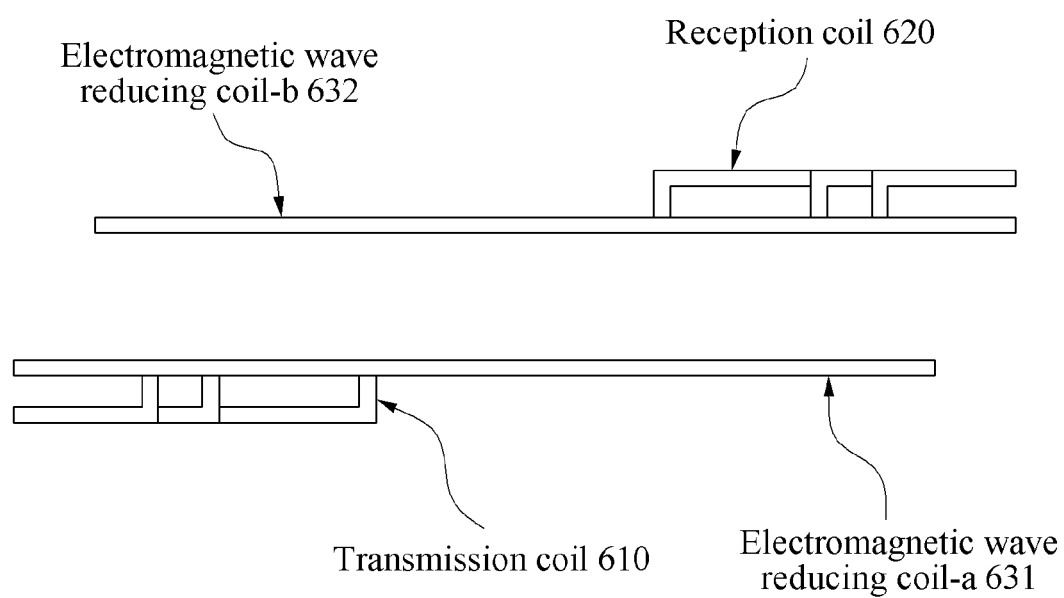

FIGS. 6B and 6C are examples in which electromagnetic wave reducing coils are attached to the transmission coil 610 and the reception coil 620, respectively. In detail, FIG. 6B is a three-dimensional perspective view thereof, and FIG. 6C is a side view thereof. When electromagnetic wave reducing coils are inserted into two coils used for transmission and reception by attaching an electromagnetic wave reducing coil-a 631 to the transmission coil 610 and an electromagnetic wave reducing coil-b 632 to the reception coil 620, the effect of reducing an electromagnetic wave may improve, and thus the power transmission efficiency may increase further.

Figure 6D:
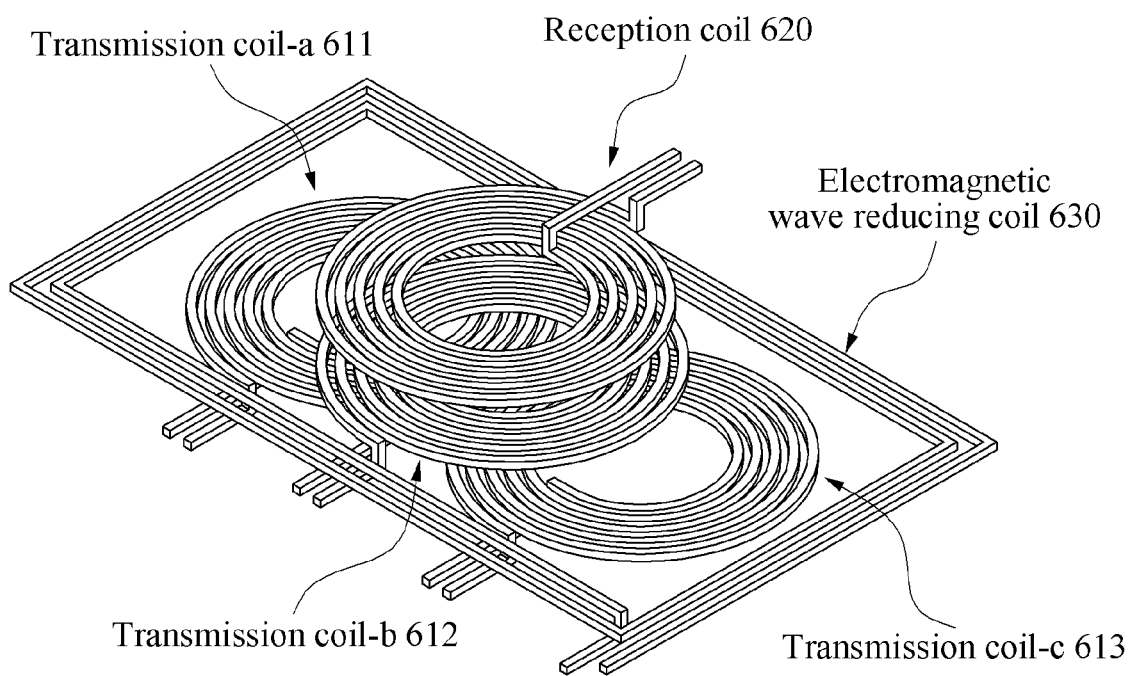

FIG. 6D is an example in which the electromagnetic wave reducing coil 630 is applied in a case of providing a plurality of transmission coils. The electromagnetic wave reducing coil 630 may be implemented to enclose a plurality of transmission coils 611, 612, and 613 on the same plane. In this example, an unnecessary electromagnetic wave generated in response to an operation of at least one of the plurality of transmission coils 611, 612, and 613 may be blocked by the electromagnetic wave reducing coil 630 that encloses the transmission coils 611, 612, and 613.

Figure 7A:
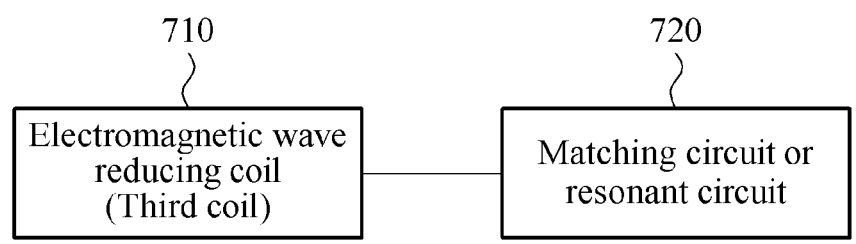
FIGS. 7A and 7B illustrate connection between an electromagnetic wave reducing coil and a matching circuit or resonant device according to an example embodiment.
Figure 7B:
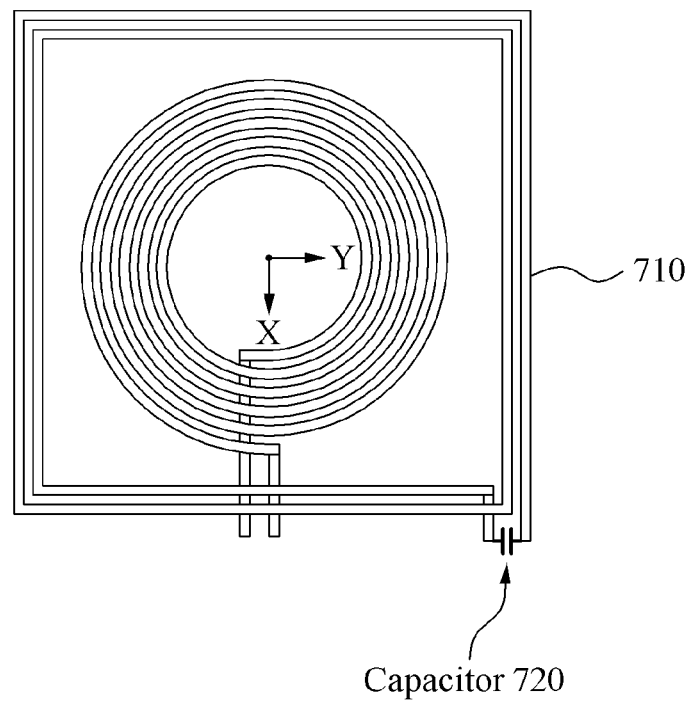

FIGS. 7A and 7B illustrate connection between an electromagnetic wave reducing coil and a matching circuit or resonant circuit according to an example embodiment.

To increase an effect of reducing unnecessary harmonics in a wireless power transmission process, an impedance matching circuit or resonant circuit 720, for example, a resonant device such as a capacitor, a resistor, or an inductor, may be connected to an electromagnetic wave reducing coil 710 as shown in FIGS. 7A and 7B. The impedance matching circuit or resonant circuit 720 may be a device to adjust a frequency domain of a signal subject to electromagnetic wave reduction. A circuit or device to be used to adjust an impedance or a resonant frequency of the electromagnetic wave reducing coil 710 may be used. For example, in a wireless power transmission process, harmonics generated in a case in which a frequency f0 of a signal to be transmitted is 100 kilohertz (kHz) may have a band greater than or equal to 200 kHz. Thus, the electromagnetic wave reducing coil 710 and the matching circuit or resonant circuit 720 may be controlled to set a resonant frequency of the electromagnetic wave reducing coil 710 to 200 kHz corresponding to the frequency domain of the harmonics to be reduced. In this example, results of high pass characteristic of FIG. 8A or band pass characteristic of FIG. 8B may be obtained.

Figure 8B:
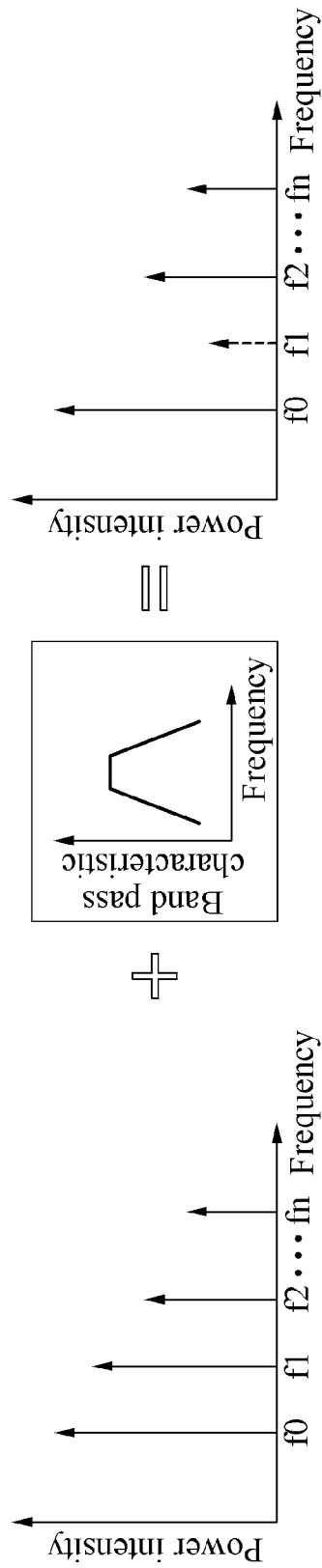

FIGS. 8A and 8B illustrate an effect of reducing an electromagnetic wave by connection between an electromagnetic wave reducing coil and a matching circuit or resonant device according to an example embodiment.

As shown in FIGS. 7A and 7B, in a case in which the impedance matching circuit or resonant circuit 720 is connected to the electromagnetic wave reducing coil 710, an effect of reducing unnecessary harmonics may increase by adjusting a resonant frequency of the electromagnetic wave reducing coil 710.

For example, in a case in which the resonant frequency of the electromagnetic wave reducing coil 710 is adjusted in view of the frequency domain of the harmonics to be reduced, by blocking signals in a domain greater than or equal to a predetermined frequency using a high pass characteristic as shown in FIG. 8A, or by blocking signals in a band corresponding to a predetermined frequency domain using a band pass characteristic as shown in FIG. 8B, the harmonic components may be reduced efficiently when compared to a case in which the electromagnetic wave reducing coil 710 is solely used.

Figure 9:
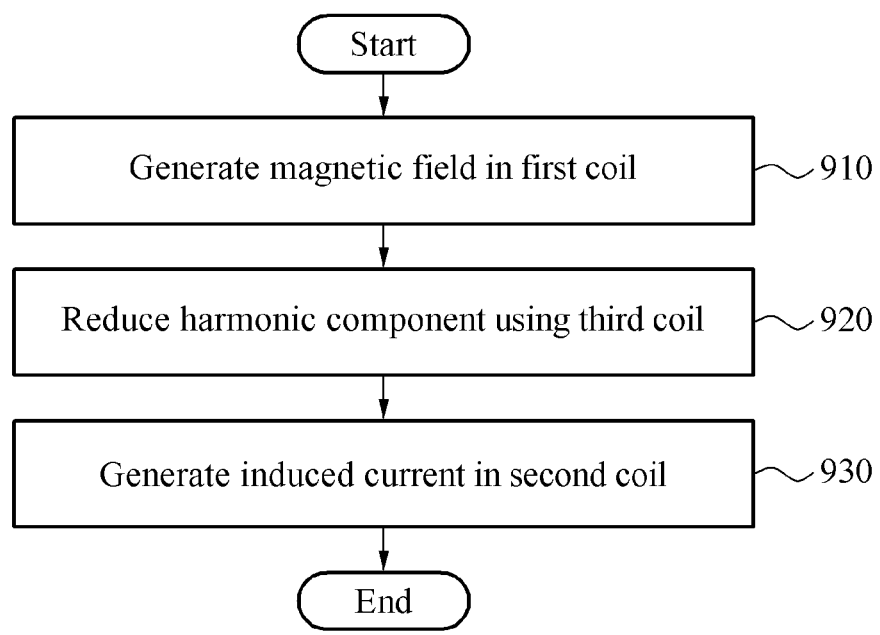
FIG. 9 is a flowchart illustrating a method of reducing an electromagnetic wave according to an example embodiment.

FIG. 9 is a flowchart illustrating a method of reducing an electromagnetic wave according to an example embodiment.

A wireless power transmission device according to an example embodiment provides a method of reducing an electromagnetic wave (unnecessary for power transmission) that influences the wireless power transmission device or is externally emitted, except for a frequency signal to be transmitted, through a relatively simple scheme of additionally inserting a third coil to reduce an electromagnetic wave, in a process of transmitting wireless power or energy.

Referring to FIG. 9, in operation 910, a transmitter of the wireless power transmission device may generate a magnetic field by inputting a high-frequency power signal generated by a transmission circuit into a first coil. The high-frequency power signal may be a square wave signal generated using a switching device included in the transmission circuit.

In operation 920, a reducer of the wireless power transmission device may reduce a harmonic component of the high-frequency power signal using a third coil inserted between the first coil and a second coil. The third coil may have a diameter greater than or equal to a diameter of the first coil and/or the second coil, and be inserted to enclose at least one of the first coil or the second coil. However, the position and the size of the third coil are not limited thereto, and the third coil may be implemented in any of various manners. For example, the third coil may be inserted to be disposed on a plane on which at least one of the first coil or the second coil is disposed.

The reducer may adjust a reference frequency of the harmonic component to be reduced by adjusting an inductance or a number of turns of the third coil. Further, the reducer may connect at least one of an impedance matching circuit or a resonant device to the third coil to increase an effect of reducing the harmonic component, and adjust a resonant frequency of the third coil to be less than or equal to a frequency domain of the harmonic component to be reduced using at least one of the impedance matching circuit or the resonant device. Further, the reducer may reduce the harmonic component in a different manner based on a coiling direction of the third coil. For example, the reducer may attenuate an even mode signal of the harmonic component when the coiling direction of the third coil is the same as coiling directions of the first coil and the second coil, and attenuate an odd mode signal of the harmonic component when the coiling direction of the third coil is opposite to the coiling directions of the first coil and the second coil.

In operation 930, a receiver of the wireless power transmission device may generate an induced current by allowing a signal except for the harmonic component reduced through the third coil in the magnetic field generated in the first coil to pass through the second coil. The first coil and the second coil may each be at least one of a solenoid loop coil or a helical loop coil.

The units and/or modules described herein may be implemented using hardware components and software components. For example, the hardware components may include microphones, amplifiers, band pass filters, audio to digital convertors, and processing devices. A processing device may be implemented using one or more hardware device configured to carry out and/or execute program code by performing arithmetical, logical, and input/output operations. The processing device(s) may include a processor, a controller and an arithmetic logic unit, a digital signal processor, a microcomputer, a field programmable gate array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such as parallel processors.

The software may include a computer program, a piece of code, an instruction, or some combination thereof, to independently or collectively instruct and/or configure the processing device to operate as desired, thereby transforming the processing device into a special purpose processor. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described embodiments, or vice versa.

A number of embodiments have been described above. Nevertheless, it should be understood that various modifications may be made to these embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claim.

What is claimed is:

1. A wireless charge transmitter comprising:
   a transmission coil configured to transmit wireless power into a reception coil of a wireless charge receiver; and
   a reducing coil connected to a resonant circuit for reducing a unnecessary harmonic component generated by the transmission coil,
   a controller configured to set a resonant frequency of the reducing coil to a frequency corresponding to the harmonic component to be reduced,
   wherein the controller is configured to adjust the resonant frequency of the reducing coil in view of a frequency domain of the harmonic component to be reduced by blocking signals in a domain greater than a predetermined frequency using a high pass characteristic,
   wherein the reducing coil encloses the transmission coil and the reception coil with a diameter greater than a diameter of the transmission coil and the reception coil,
   wherein a coiling direction of the reducing coil is the same as a coiling direction of the transmission coil for reducing an even mode of the harmonic component, and
   wherein the coiling direction of the reducing coil is different from the coiling direction of the transmission coil for reducing an odd mode of the harmonic component.

2. The wireless charge transmitter of claim 1, wherein the reducing coil is disposed on a plane on which the transmission coil is disposed.

3. The wireless charge transmitter of claim 1, wherein the reducing coil is disposed at a lower position than a plane on which the transmission coil is disposed.

4. The wireless charge transmitter of claim 1, wherein the transmission coil, the reception coil and the reducing coil are disposed on a ferromagnetic material such as ferrite.

5. The wireless charge transmitter of claim 1, wherein an inductance or a number of turns of the reducing coil is determined based on a frequency of the unnecessary harmonic component.

6. The wireless charge transmitter of claim 1, wherein the reducing coil is disposed to tilt with respect to a plane on which the transmission coil is disposed.

* * * * *